US010163411B2

(12) United States Patent
Huang et al.

(10) Patent No.: US 10,163,411 B2
(45) Date of Patent: Dec. 25, 2018

(54) LIQUID CRYSTAL DISPLAY DEVICE AND DRIVING METHOD THEREOF

(71) Applicant: Chunghwa Picture Tubes, LTD., Taoyuan (TW)

(72) Inventors: Yi-Hsing Huang, Taoyuan (TW); Hsin-Chung Huang, New Taipei (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 66 days.

(21) Appl. No.: 15/450,670

(22) Filed: Mar. 6, 2017

(65) Prior Publication Data

US 2018/0182327 A1 Jun. 28, 2018

(30) Foreign Application Priority Data

Dec. 26, 2016 (CN) .......................... 2016 1 1215441

(51) Int. Cl.
*G09G 3/36* (2006.01)
*G02F 1/1362* (2006.01)

(52) U.S. Cl.
CPC ..... *G09G 3/3614* (2013.01); *G02F 1/136286* (2013.01); *G09G 2310/0251* (2013.01); *G09G 2310/06* (2013.01)

(58) Field of Classification Search
CPC ...... G02F 1/136286; G09G 2310/0251; G09G 2310/06; G09G 3/3614
USPC ........................... 345/89, 100, 209, 214, 690
See application file for complete search history.

(56) References Cited

U.S. PATENT DOCUMENTS

| | | | | |
|---|---|---|---|---|
| 2007/0139327 | A1* | 6/2007 | Liu | G09G 3/3614 345/89 |
| 2007/0229433 | A1* | 10/2007 | Jang | G09G 3/3677 345/96 |
| 2008/0012819 | A1* | 1/2008 | Lee | G09G 3/3677 345/100 |
| 2009/0303166 | A1* | 12/2009 | Tsubata | G09G 3/342 345/87 |
| 2011/0102415 | A1 | 5/2011 | Yoon et al. | |
| 2011/0170014 | A1* | 7/2011 | Irie | G09G 3/3614 348/731 |
| 2011/0187755 | A1* | 8/2011 | Choi | G09G 5/10 345/690 |
| 2011/0248985 | A1* | 10/2011 | Lin | G09G 3/3614 345/214 |
| 2011/0292012 | A1* | 12/2011 | Huang | G09G 3/3614 345/209 |
| 2012/0299971 | A1* | 11/2012 | Hotelling | G09G 3/3614 345/690 |

(Continued)

FOREIGN PATENT DOCUMENTS

| | | |
|---|---|---|
| TW | 200839710 | 10/2008 |
| TW | 201017614 | 5/2010 |

*Primary Examiner* — Tony O Davis
(74) *Attorney, Agent, or Firm* — J.C. Patents

(57) ABSTRACT

A liquid crystal display (LCD) device and a driving method thereof are provided. Data lines are grouped into a plurality of data line groups according to polarities of data driving signals corresponding to the data lines, and the data line groups are respectively driven, where driving periods of the data line groups are spaced by a predetermined time interval, so as to effetely decrease a coupling effect and greatly improve the display quality of the LCD device.

6 Claims, 5 Drawing Sheets

(56) References Cited

U.S. PATENT DOCUMENTS

| | | | | |
|---|---|---|---|---|
| 2013/0314389 | A1* | 11/2013 | Wang | G09G 3/3648 345/211 |
| 2015/0146121 | A1 | 5/2015 | Kimura | |
| 2016/0210914 | A1* | 7/2016 | Chen | G09G 3/3611 |
| 2016/0284313 | A1* | 9/2016 | Lin | G09G 5/008 |

* cited by examiner

LIQUID CRYSTAL DISPLAY DEVICE AND DRIVING METHOD THEREOF

CROSS-REFERENCE TO RELATED APPLICATION

This application claims the priority benefit of China application serial no. 201611215441.9, filed on Dec. 26, 2016. The entirety of the above-mentioned patent application is hereby incorporated by reference herein and made a part of this specification.

BACKGROUND OF THE INVENTION

Field of the Invention

The invention relates to a display device, and particularly relates to a liquid crystal display (LCD) device and a driving method thereof.

Description of Related Art

Along with development of display technology, liquid crystal displays (LCD) have occupied an important position in daily life, and consumer's demands on performance and power consumption of the LCD become higher. Regarding a driving method of the LCD, in order to avoid a phenomenon of liquid crystal molecule polarization, the LCD generally adopts a driving method of polarity reversal, by which voltages of different polarities (for example, a positive polarity and a negative polarity) are used to drive liquid crystal molecules in alternation at different time. However, a variation of a voltage difference of such driving method is very large, and the large voltage variation may cause a plurality of coupling effects, which may decrease display quality of the LCD.

SUMMARY OF THE INVENTION

The invention is directed to a liquid crystal display (LCD) device and a driving method thereof, which are adapted to effectively decrease coupling effects appeared when pixels are driven, so as to improve display quality of the LCD device.

The invention provides an LCD device including a display panel and a driving circuit. The display panel includes a plurality of scan lines, a plurality of data lines and a plurality of pixels. The plurality of pixels are respectively configured at intersections of the scan lines and the data lines, and are coupled to the corresponding scan lines and the data lines. The driving circuit is coupled to the scan lines and the data lines, and during a driving period of each of the scan lines, the driving circuit determines polarities of data driving signals corresponding to the data lines according to display data, and groups the data lines into a plurality of data line groups according to the polarities of the data driving signals corresponding to the data lines, so as to respectively drive the data line groups, where driving period of the data line groups are spaced by a predetermined time interval.

In an embodiment of the invention, the data driving signals corresponding to the adjacent data lines in each of the data line groups have opposite polarities.

In an embodiment of the invention, each of the data line groups includes two data lines having a first polarity and one data line having a second polarity.

In an embodiment of the invention, each of the data line groups includes data lines having the first polarity and data lines having the second polarity, where the number of the data lines having the first polarity and the number of the data lines having the second polarity are the same.

The invention provides a driving method of an LCD device, where the LCD device includes a plurality of scan lines, a plurality of data lines and a plurality of pixels. The plurality of pixels are respectively configures at intersections of the scan lines and the data lines, and are coupled to the corresponding scan lines and the data lines. The driving method of the LCD device includes: determining polarities of data driving signals corresponding to the data lines according to display data during a driving period of each of the scan lines; grouping the data lines into a plurality of data line groups according to the polarities of the data driving signals corresponding to the data lines; and respectively driving the data line groups, where driving periods of the data line groups are spaced by a predetermined time interval.

In an embodiment of the invention, the data driving signals corresponding to the adjacent data lines in each of the data line groups have opposite polarities.

In an embodiment of the invention, each of the data line groups includes two data lines having a first polarity and one data line having a second polarity.

In an embodiment of the invention, each of the data line groups includes data lines having the first polarity and data lines having the second polarity, where the number of the data lines having the first polarity and the number of the data lines having the second polarity are the same.

According to the above description, the data lines are grouped into a plurality of data line groups according to the polarities of the data driving signals corresponding to the data lines, and the data line groups are respectively driven, where the driving periods of the data line groups are spaced by the predetermined time interval, so as to avoid simultaneously charging the pixels corresponding to all of the data lines to effetely decrease the coupling effect and greatly improve the display quality of the LCD device.

DESCRIPTION OF EMBODIMENTS

Figure 1:
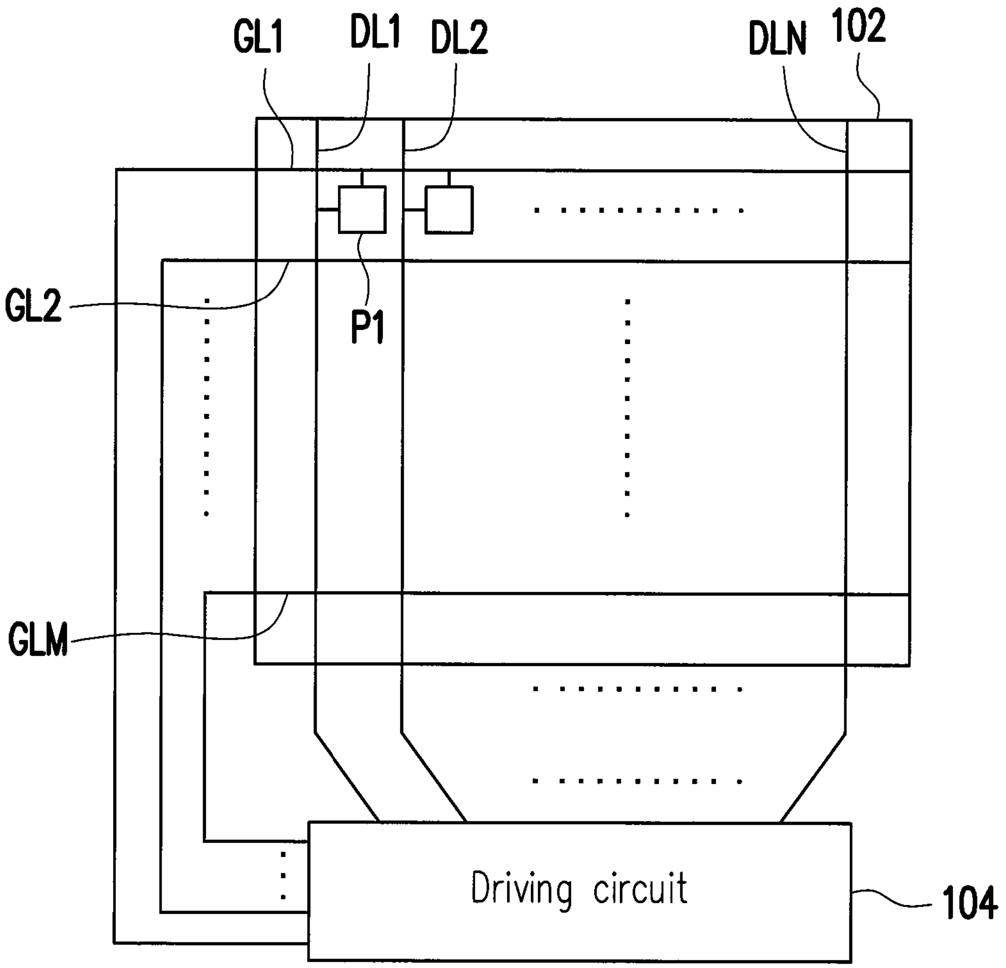
FIG. 1 is a schematic diagram of a liquid crystal display (LCD) device according to an embodiment of the invention.

FIG. 1 is a schematic diagram of a liquid crystal display (LCD) device according to an embodiment of the invention. Referring to FIG. 1, the LCD device includes a display panel 102 and a driving circuit 104, where the display panel 102 includes a plurality of scan lines GL1-GLM, a plurality of data lines DL1-DLN and a plurality of pixels P1, where M and N are positive integers, the pixels P1 are respectively configured at intersections of the corresponding scan lines GL1-GLM and the data lines DL1-DLN, and are coupled to the corresponding scan lines GL1-GLM and the data lines DL1-DLN. The driving circuit 104 may determine polarities of data driving signals corresponding to the data lines DL1-DLN according to display data during a driving period of each of the scan lines GL1-GLM, and groups the data lines DL1-DLN into a plurality of data line groups according to the polarities of the data driving signals corresponding to the data lines DL1-DLN, so as to respectively drive the data line groups, where driving periods of the data line groups are spaced by a predetermined time interval.

Figure 2:
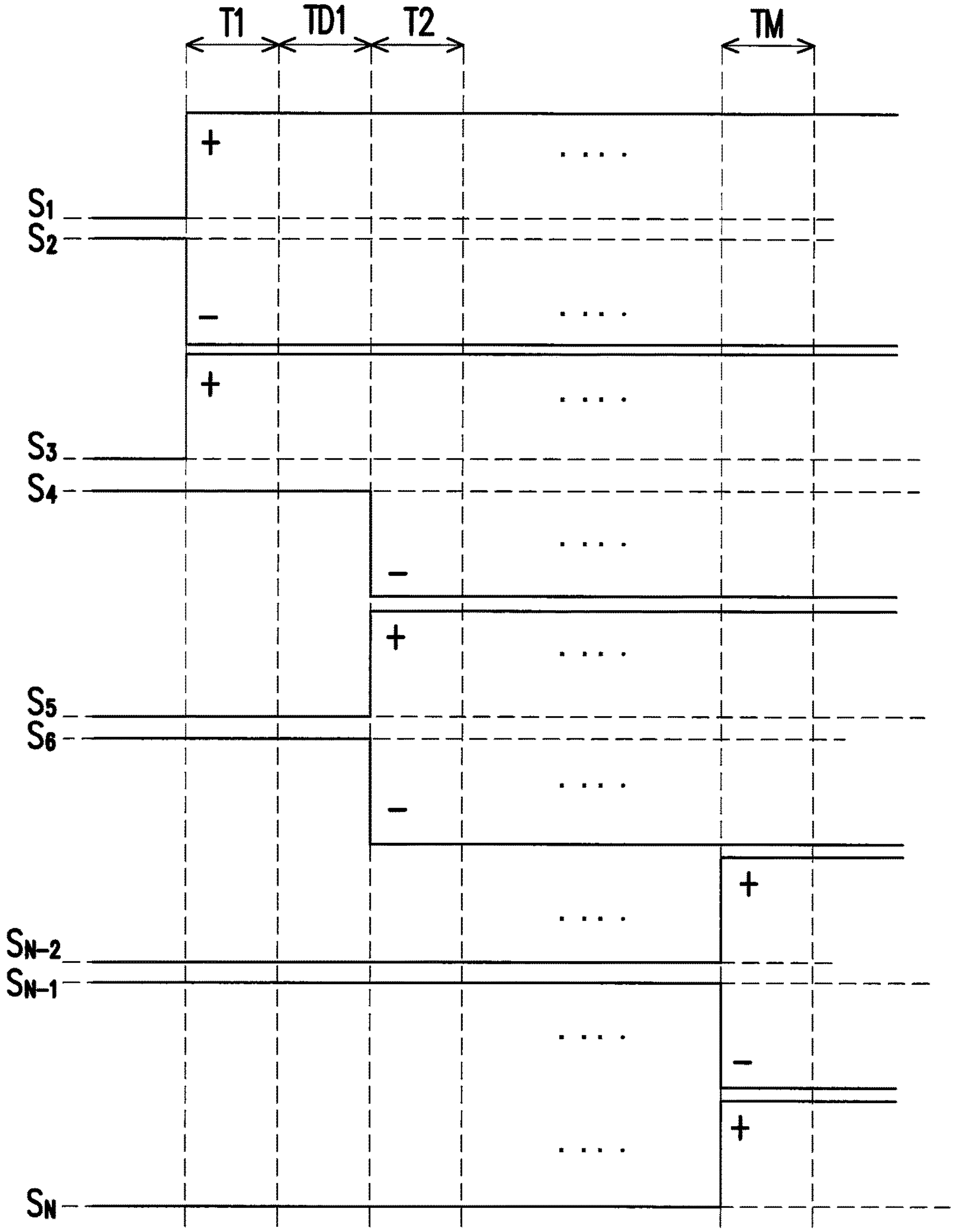
FIG. 2 is a waveform schematic diagram of data driving signals of data lines according to an embodiment of the invention.

For example, FIG. 2 is a waveform schematic diagram of data driving signals of the data lines according to an embodiment of the invention. Referring to FIG. 2, in the present embodiment, during a scan period of one scan line, every three data lines are grouped into one data line group according to the polarities of the data driving signals corresponding to the data lines, and the data driving signals corresponding to the adjacent data lines in each of the data line groups have opposite polarities. For example, a first data line DL1 to a third data line DL3 are grouped into a same data line group, where data driving signals S1, S3 corresponding to the first data line DL1 and the third data line DL3 have the same polarity (for example, a positive polarity), and a polarity of a data driving signal S2 corresponding to a second data line DL2 is opposite to the polarity of the data driving signals S1, S3 corresponding to the first and third data lines DL1, DL3 (for example, the data driving signal S2 has a negative polarity). Similarly, a fourth data line DL4 to a sixth data line DL6 are grouped into a same data line group, where data driving signals S4, S6 corresponding to the fourth data line DL4 and the sixth data line DL6 have the same polarity (for example, a negative polarity), and a polarity of a data driving signal S5 corresponding to a fifth data line DL5 is opposite to the polarity of the data driving signals S4, S6 corresponding to the fourth and sixth data lines DL4, DL6 (for example, the data driving signal S5 has the positive polarity). Deduce by analogy, data driving signals SN-2~SN are respectively data driving signals corresponding to an (N-2)$^{th}$ data line to an N$^{th}$ data line, where N is a positive integer greater than or equal to 3, and the polarity of the data driving signal SN-1 is opposite to the polarity of the data driving signals SN-2 and SN. Moreover, different data line groups are driven at different times, for example, the first data line DL1 to the third data line DL3 are driven at a driving period T1, the fourth data line DL4 to the sixth data line DL6 are driven at a driving period T2, and the (N-2)$^{th}$ data line DLN-2 to the N$^{th}$ data line DLN are driven at a driving period TM, where M is a positive integer. Moreover, the driving periods of different data line groups are spaced by a delay time, for example, the driving periods T1 and the driving period T2 are spaced by a delay time TD1.

Figure 3:
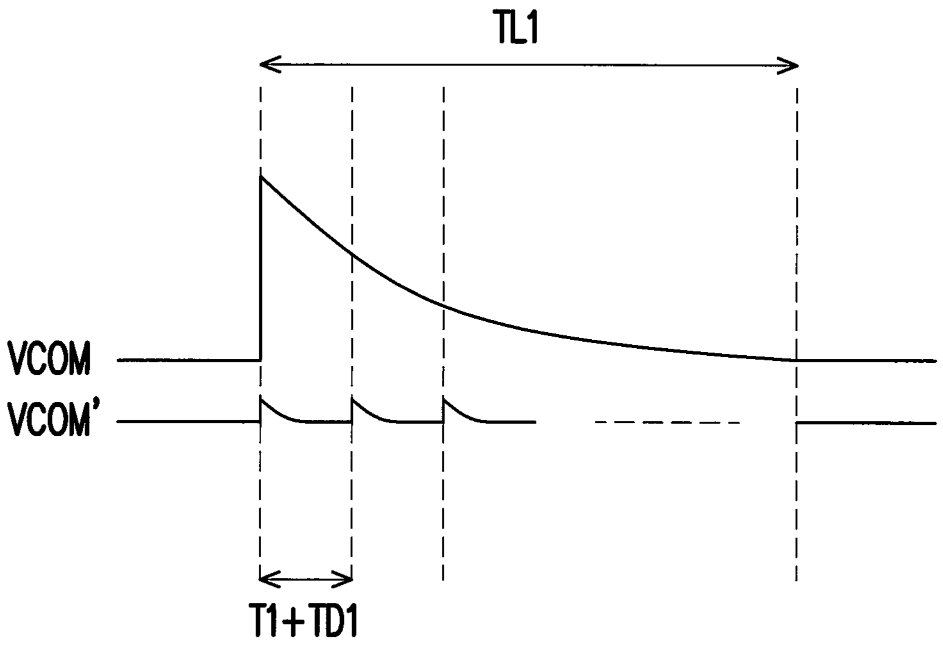
FIG. 3 is a waveform schematic diagram of a common electrode voltage of pixels corresponding to driven data lines when the data lines are driven by the data driving signals of the embodiment of FIG. 2.

FIG. 3 is a waveform schematic diagram of a common electrode voltage of the pixels corresponding to the driven data lines when the data lines are driven by the data driving signals of the embodiment of FIG. 2. Referring to FIG. 3, by grouping the data lines into a plurality of data line groups according to the polarities of the data driving signals corresponding to the data lines, and driving the data line groups at different periods, a fluctuation amplitude of a common electrode voltage of the pixels caused when the data driving signals are applied to the data lines is effectively decreased, so as to obtain a stable common electrode voltage VCOM', and effectively mitigate gray level inaccuracy of pixel display and a color shift phenomenon. As shown in FIG. 3, compared to the existing technique that the data driving signals are simultaneously applied to all of the data lines during the scan period TL1 of one scan line, a fluctuation amplitude of the common electrode voltage VCOM corresponding to the existing driving method is much more greater than the fluctuation amplitude of the common electrode voltage VCOM' of the present embodiment. Moreover, since the driving periods of each of the data line groups of the present embodiment are spaced by a predetermined time, the coupling effect between the data line groups are further decreased, so as to greatly improve the display quality of the LCD device.

Figure 4:
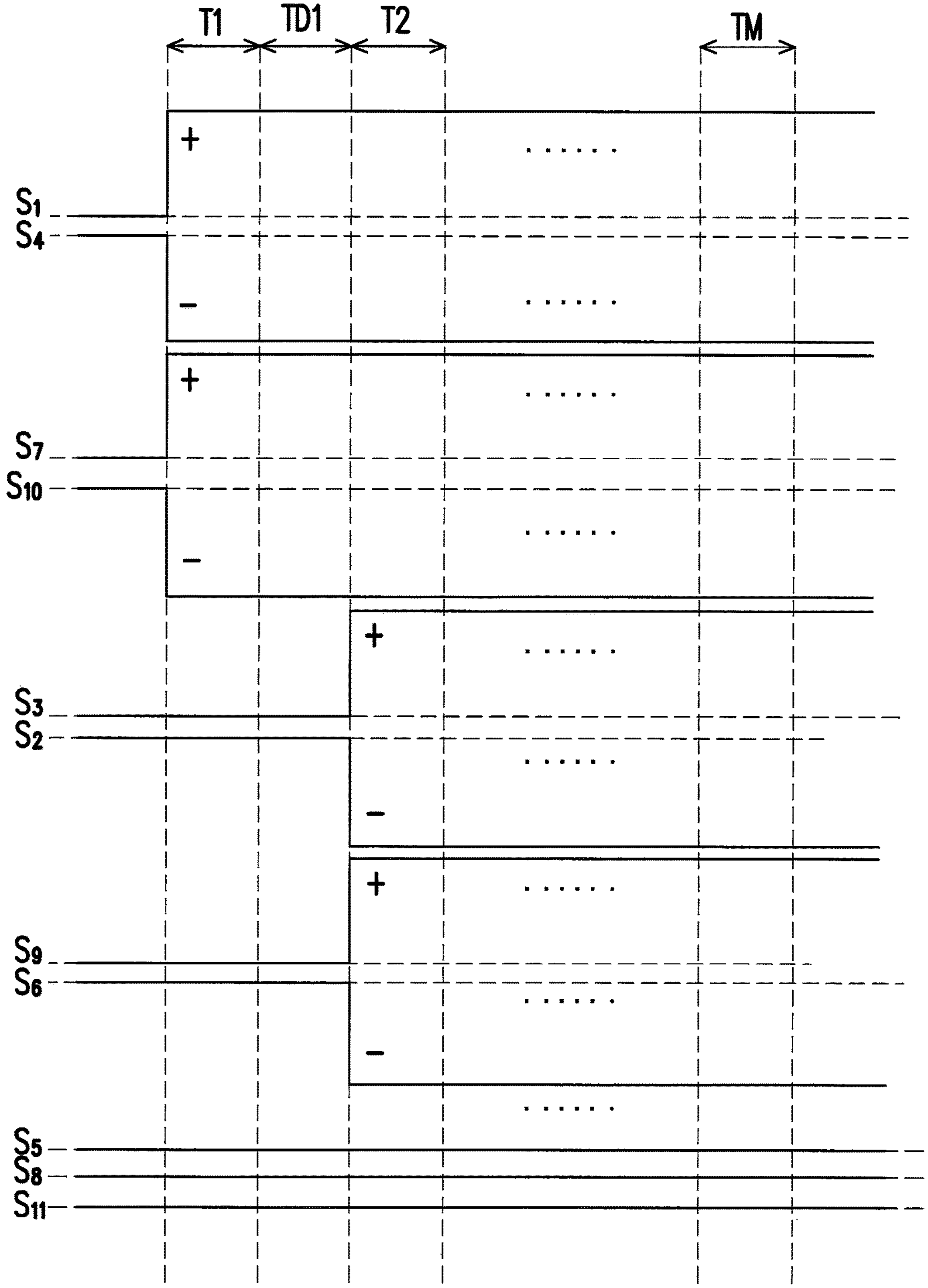
FIG. 4 is a waveform schematic diagram of data driving signals of the data lines according to another embodiment of the invention.

It should be noted that the number of the data lines included in each of the data line groups is not limited to the embodiment of FIG. 2. Moreover, the data line groups are not limited to be sequentially driven. For example, FIG. 4 is a waveform schematic diagram of the data driving signals of the data lines according to another embodiment of the invention. As shown in FIG. 4, the driving circuit 104 may group the data lines with the same quantity and opposite polarities into a same data line group according to display data, for example, group the data lines DL1, DL4, DL7 and DL10 into a same data line group, and group the data lines DL3, DL2, DL9 and DL6 into a same data line group, where the data driving signals S1, S7, S3 and S9 corresponding to the data lines DL1, DL7, DL3 and DL9 have the positive polarity, and the data driving signals S4, S10, S2 and S6 corresponding to the data lines DL4, DL10, DL2 and DL6 have the negative polarity. Moreover, the data lines that are not applied with the data driving signals (or the data driving signals do not have polarity) can be grouped into a same data line group, for example, the data lines DL5, DL8 and DL11 corresponding to the data driving signals S5, S8 and S11 are grouped into one data line group. Similarly, the different data line groups are driven at different times, and the driving periods of different data line groups are spaced by a delay time, for example, the delay time TD1, so as to mitigate the fluctuation amplitude of the common electrode voltage, and decrease the coupling effect of the data lines, and greatly improve the display quality of the LCD device.

Figure 5:
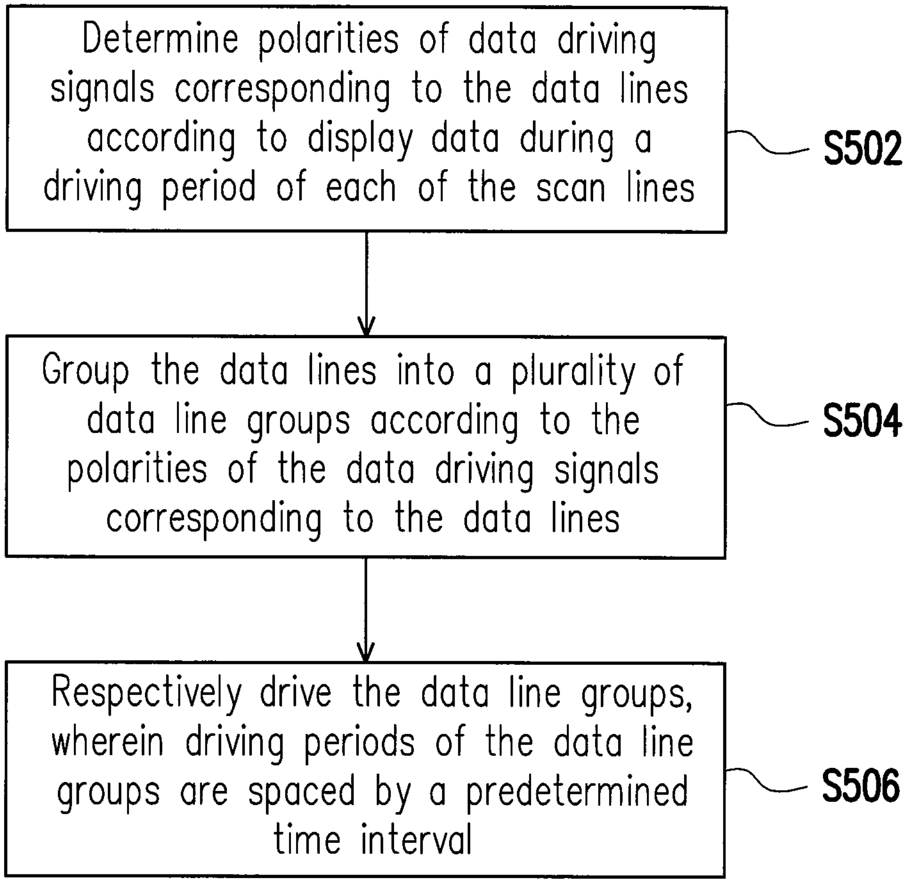
FIG. 5 is a flowchart illustrating a driving method of an LCD device according to an embodiment of the invention.

FIG. 5 is a flowchart illustrating a driving method of an LCD device according to an embodiment of the invention. Referring to FIG. 5, according to the aforementioned embodiment, it is known that the driving method of the LCD device includes following steps. First, polarities of data driving signals corresponding to the data lines are determined according to display data during a driving period of each of the scan lines (step S502). Then, the data lines are grouped into a plurality of data line groups according to the polarities of the data driving signals corresponding to the data lines (step S504), where the data driving signals corresponding to the adjacent data lines in each of the data line groups have opposite polarities, for example, each of the data line groups may include two data lines having a first polarity and one data line having a second polarity, where the data line having the second polarity is located between the two data lines having the first polarity. In some embodiments, each of the data line groups may include the same number of data lines of the first polarity and data lines of the second polarity. Finally, the data line groups are respectively driven, where driving period of the data line groups are spaced by a predetermined time interval (step S506).

In summary, in the embodiments of the invention, the data lines are grouped into a plurality of data line groups according to the polarities of the data driving signals corresponding to the data lines, and the data line groups are respectively driven, where the driving periods of the data line groups are spaced by the predetermined time interval, so as to avoid simultaneously charging the pixels corresponding to all of the data lines to effetely decrease the coupling effect and greatly improve the display quality of the LCD device.

What is claimed is:

1. A liquid crystal display device, comprising:

a display panel, comprising:

a plurality of scan lines;

a plurality of data lines; and a plurality of pixels, respectively configured at intersections of the scan lines and the data lines, and coupled to the corresponding scan lines and the data lines; and a driving circuit, coupled to the scan lines and the data lines, determining polarities of data driving signals corresponding to the data lines according to display data during a driving period of each of the scan lines, and grouping the data lines into a plurality of data line groups according to the polarities of the data driving signals corresponding to the data lines, so as to respectively drive the data line groups, wherein the data driving signals corresponding to the adjacent data lines in each of the data line groups to have opposite polarities, and wherein driving periods of the data line groups are spaced by a predetermined time interval.

2. The liquid crystal display device as claimed in claim 1, wherein each of the data line groups comprises two data lines having a first polarity and one data line having a second polarity.

3. The liquid crystal display device as claimed in claim 1, wherein each of the data line groups comprises data lines having the first polarity and data lines having the second polarity, wherein the number of the data lines having the first polarity and the number of the data lines having the second polarity are the same.

4. A method of driving a liquid crystal display device, wherein the liquid crystal display device comprises a plurality of scan lines, a plurality of data lines and a plurality of pixels, the plurality of pixels are respectively configures at intersections of the scan lines and the data lines, and are coupled to the corresponding scan lines and the data lines, the method of driving the liquid crystal display device comprising:

determining polarities of data driving signals corresponding to the data lines according to display data during a driving period of each of the scan lines;

grouping the data lines into a plurality of data line groups according to the polarities of the data driving signals corresponding to the data lines, wherein the data driving signals corresponding to the adjacent data lines in each of the data line groups to have opposite polarities; and respectively driving the data line groups, wherein driving periods of the data line groups are spaced by a predetermined time interval.

5. The method of claim 4, wherein each of the data line groups comprises two data lines having a first polarity and one data line having a second polarity.

6. The method of claim 4, wherein each of the data line groups comprises data lines having the first polarity and data lines having the second polarity, wherein the number of the data lines having the first polarity and the number of the data lines having the second polarity are the same.

* * * * *